US005654806A

United States Patent [19]
Truong

[11] Patent Number: 5,654,806
[45] Date of Patent: Aug. 5, 1997

[54] CODE MANIPULATION FOR A HIGH SPEED JPEG DECODER

[75] Inventor: Thanh D. Truong, Walnut, Calif.

[73] Assignee: Xerox Corporation, Stamford, Conn.

[21] Appl. No.: 642,991

[22] Filed: May 6, 1996

[51] Int. Cl.$^6$ .................................................. H04N 1/41
[52] U.S. Cl. ......................... 358/427; 358/426; 382/250
[58] Field of Search .............................. 358/426–427, 358/261.1–261.3, 430, 539; 341/65, 67; 364/725; 382/246, 248, 250

[56] References Cited

U.S. PATENT DOCUMENTS

| | | | |
|---|---|---|---|
| 5,157,488 | 10/1992 | Pennebaker | 358/133 |
| 5,379,070 | 1/1995 | Retter et al. | 348/403 |
| 5,497,246 | 3/1996 | Abe | 358/426 |
| 5,535,290 | 7/1996 | Allen | 382/250 |
| 5,588,075 | 12/1996 | Chiba et al. | 382/246 |

Primary Examiner—Edward L. Coles, Sr.
Assistant Examiner—Stephen Brinich
Attorney, Agent, or Firm—Robert Cunha

[57] ABSTRACT

A circuit for decoding one non-zero JPEG encoded pixel per clock cycle, the coded word being of variable length. For a pixel with leading zeros, a two stage pipeline is used, the first stage having one adder for calculating an delta value between the smallest number the variable length portion could be and the actual value, the second stage being an adder for adding the delta value to a base address to generate an address for a look up table, the output being the decoded value. This takes two clock periods to decode a pixel having at least one leading zero. For the Huffman code portion of encoded pixels with no leading zero's, only ten versions of which exist, a gate array for each is provided. Each detects one version and outputs the decoded Huffman code data in one clock cycle. A multiplexer then either selects the decoded data with no leading zero's in one clock cycle or the data with at least one leading zero in two clock cycles.

4 Claims, 4 Drawing Sheets

| PIXEL # | 1 | 2 | 3 | 4 | 5 | 6 | 7 | 8 | 9 | 10 | 11 | 12 | 13 | 14 | 15 | ... | ... | 63 |
|---|---|---|---|---|---|---|---|---|---|---|---|---|---|---|---|---|---|---|
| AC COEFFICIENT | 0 | 0 | 0 | -12 | 0 | 9 | -456 | -102 | +89 | +981 | -16 | -1 | 0 | 0 | 0 | ... | 0 | 0 |
| RRRR | 1 | 2 | 3 | 3 | 1 | 1 | 0 | 0 | 0 | 0 | 0 | 0 | 1 | 2 | 3 | ... | 0 | 43 |
| SSSS | | | | 4 | | 4 | 9 | 7 | 7 | A | 5 | 1 | | | | | | |
| ADDITIONAL BITS | | | | 0011 | | 1001 | 000110111 | 001100111 | 101100111 | 111101010 | 01011 | 0 | | | | | | |

Compressed data for the above address is as follows (according to JPEG book, Appendex A):
1111110111_0011,1111111100001010_1001,1111110110_000110111,1111000_0011001,

1111000_1011001, 1111111110100_111101010, 11001_01111,01_0,00 (EOB)

Rearrange the above data stream into 32 bit word:

CODE MANIPULATION FOR A HIGH SPEED JPEG DECODER

BACKGROUND OF THE INVENTION

A high speed circuit for Huffman decoding capable of decoding data at the rate of one pixel per clock cycle, including an additional set of gate arrays for decoding Huffman codes corresponding to a pixel having no leading zeros.

In image handling systems the amount of data per page is quite large. For example, at 300 pixels per inch, a page may have as many as 8 million pixels. Therefore, before storage or transmission, the data is typically compressed. However, if the compression and decompression algorithms are slow, the amount of time required to handle this large amount of data would tie up the system. It is therefore imperative that such a system has a clock frequency as high as possible, and that the algorithms execute at the rate of one pixel per clock cycle.

Huffman coding is a compression technique that assigns the smallest code words to the most common numbers. Thus, to use a numerical example, the code word for a common number like 64 would have a shorter code word than a relatively less common number like 59. However, since there is no specific number of bits per word, the exact starting place of each Huffman encoded word can not be known until the previous one has been decoded, which makes the effective use of a pipelined circuit more difficult.

In image data handling systems it is common for the system to use a predictor prior to compression, which increases the number of zero's between non-zero pixels in the data stream. This is an advantage since data with longer strings of zero's tends to compress better. After that, JPEG (Joint Photographic Expert Group) compression, which is an industry standard, is frequently used. In this system the output of the predictor is converted into a first number defining the run length of leading zeros, a second number denoting the size of the following non-zero pixel, and a set of bits having the actual non-zero pixel data.

To use a numerical example, let us assume that the first four pixels in a data stream after the predictor have values of 0, 0, 0 and −12. (In this system 12 is 1100 and −12 is the one's complement, 0011). The first step is to convert this set of numbers into a new set of three numbers specifying the number of leading zero's (3), the number of bits in the numerical value of the pixel (4) and the numerical value itself (0011). The first two numbers are given a Huffman code (111111110111) and the actual pixel value (0011) is added on to the end. The final compressed value is (1111111101110011).

SUMMARY OF THE INVENTION

As described above, this compressed value must be decompressed in a decompressor at the rate of one pixel per clock pulse, and this can be done in a two stage pipelined circuit. In the first stage, it takes one clock period to decide how many bits there are in the Huffman code, and a second clock period to retrieve the actual Huffman code. In the second stage, in one clock period the Huffman code is converted into its original form (3,4), plus a number signifying the number of bits in the entire JPEG decode word. In this numerical case, there are up to 16 bits for the Huffman portion, and up to ten for the numerical portion, so there are up to 26 bits in the JPEG code word, which requires 5 bits to describe it. Thus the total look up table output is 13 bits (4 for the run size, 4 for the data word size, and 5 for the total JPEG word size).

Since the first stage of the decoding process takes two clock periods, a pipelined circuit can not process data faster than one Huffman code every two clock periods. However, in the example above, this one decode has actually decoded four pixels (0, 0, 0 and −12). Therefore the requirement of at least one pixel decode per clock pulse has been met. Using this system, a pixel with only one leading zero will still process data at one pixel per clock, but if there are two sequential non-zero pixels, the system will no longer be able to produce a complete output on each clock pulse. What is needed is an improved decoder circuit that will continue to produce one pixel output per clock pulse even if there are sequential non-zero pixels.

This invention provides two first stages in parallel. One is as described above, and is used if there is at least one leading zero. The other stage is used for pixels having no leading zeros, and is a collection of gate arrays, each set to detect a particular code word. Consider, the Huffman part of the compressed data specifies the leading number of zero's and the number of bits in the numerical portion of the pixel. Since, by definition, there is only one number of zero's that this other stage is looking for (0), and since there is a limit of 10 bits to the size of any one pixel numerical value, then there are only 10 Huffman codes in question, and these can be detected by 10 gate arrays in parallel. Each gate array detects one of these 10, and directly outputs the corresponding Huffman decode (0 pixel word size, JPEG code word size). Therefore, in any case, using these two parallel first stages, and selecting the gate array output, if there is one, and the regular first stage if there is not, all pixel combinations are guaranteed to be decided at the rate of one pixel per clock pulse.

BRIEF DESCRIPTION OF THE DRAWINGS

FIG. 1 shows how the AC coefficients of color pixels in the Lab color space are compressed using the industry standard JPEG compression.

DETAILED DESCRIPTION OF THE INVENTION

Figure 2:
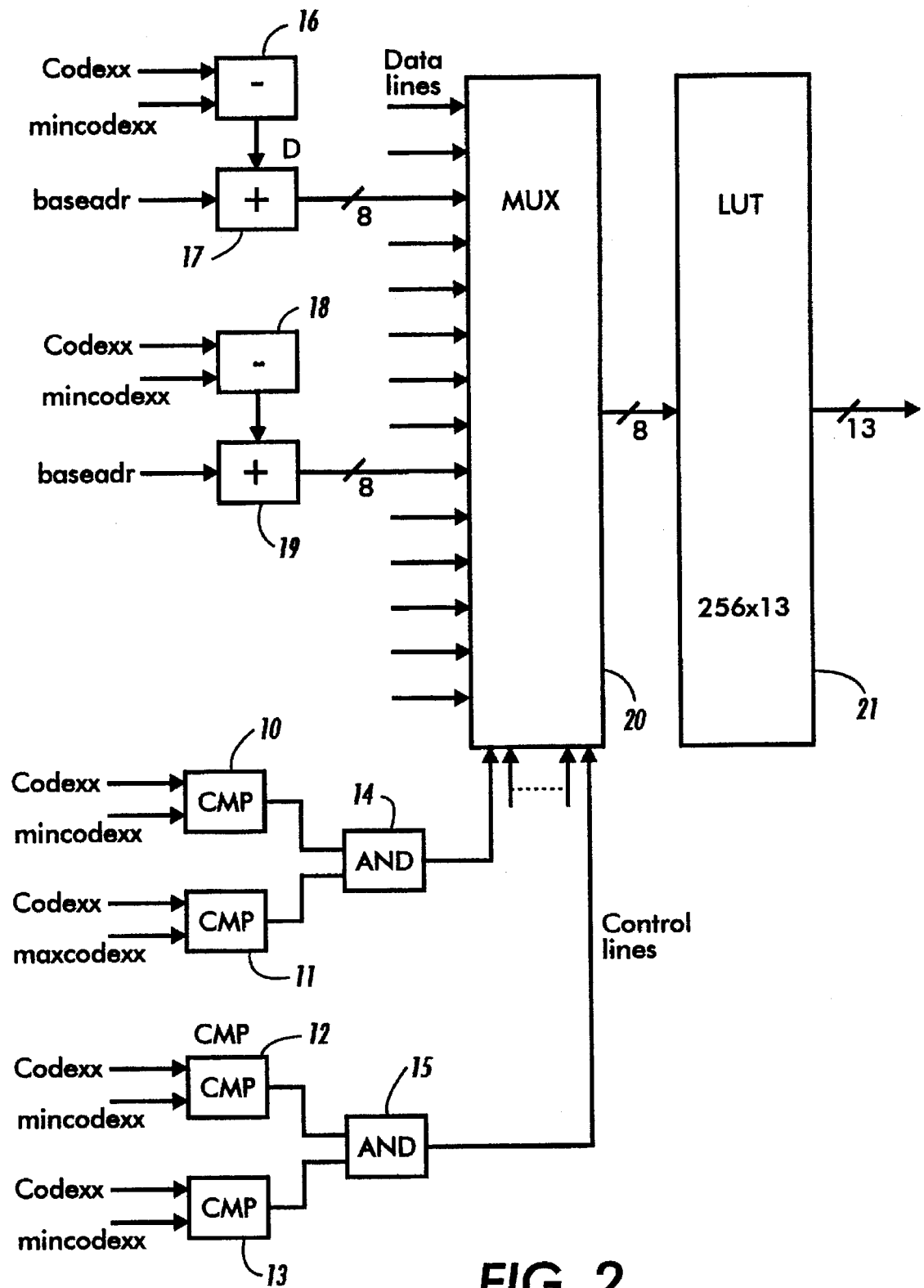
FIG. 2 is a detailed block diagram of a prior art decoder.

FIG. 1 is a numerical example of how data pixels will be compressed using JPEG compression. As shown, there are 63 pixels to be compressed, with values ranging from −456 to +981. Notice that positive numbers start with a "1" bit, and negative numbers, in one's complement, start with a "0". In all cases the "R" row contains the number of leading zeros. Thus in column 4 the number of leading zero's is 3 and in column 7 the number of leading zeros is 0. The next "S" row is the size of the data in terms of bits. Thus, for pixel number 7, since 9 binary bits are needed to write "−456" (shown in the last row) in binary, then the S row shows the number 9. Since there are 8 non zero pixels and a number of trailing zeros in the entire data stream, there are nine compressed words of compressed data shown on the compressed data line. The first pixel, three leading zero's and a pixel of −12, is compressed to 1111111101110011 as described above. The underlined space before the additional bits is shown in the compressed data line for improved readability, but does not show in the actual compressed code. Also, for readability, the complete code words are separated by comma's.

Notice that pixels numbered 8 and 9 have different numerical values (−102 and +89) but have the same number R of leading zeros (0) and S size bits (7). Therefore, the Huffman portion of the resultant compressed data codes, the 4th and 5th in the compressed data line, of these two pixels is identical (1111000). Also, the size is numbered in hexidecimal, so the decimal number 10 is shown in the S row as a hexidecimal A, and if there is a string of zero's from any point to the end of the block, this is encoded as a 00. Finally, these bits are strung together and packed into 32 bit words as shown as the rearranged data stream. This, then, is the data stream that the decoder must decode at one pixel per clock cycle.

A conventional circuit for use in decoding this bit stream is shown in FIG. 2. The multiplexer 20 has 16 unary control lines, each being controlled by a comparison circuit. Two of the 16 comparison circuits are shown, one being the array comprising blocks 10 and 11 which are comparators, and an AND gate 14. One comparison circuit is used for 16 bit Huffman codes, one for 15 bit codes, etc. Assume that the circuit comprising blocks 10, 11 and 14 is used to detect if the next 16 bits are a valid Huffman code. If so, the bits will fall within an acceptable range. The value mincodexx, which is the minimum value that an acceptable 16 bit code will have, is compared in comparator 10 to the 16 received code bits, and the output will be true if the minimum value is equal to or lower than the received bits. At the same time, the received bits are compared to a maximum value in comparator 11, and the output will be true if the maximum value is equal or higher than the received bits. If both outputs are true, the AND gate 14 will output a true signal and the multiplexer will select the associated input data line carrying the corresponding code. Huffman codes are selected so that only one comparator circuit will be able to produce a true output, and only one data line will be selected.

Each of the 16 data lines is driven by an address generator circuit. Two are shown, one being the circuit comprising adders 16 and 17. Each of these address generator circuits assumes that the Huffman code is a different number of bits (16, 15, etc), and the multiplexer 20 control lines select the correct one, as described above. The first adder 16 subtracts the value of the smallest possible Huffman code from the value actually received to generate a difference. Then, this difference is added in adder 17 to the base address of the lowest Huffman code in the look up table 21. The result is the actual 8 bit address of the correct Huffman code. Upon being thus addressed, the table 21 will output 8 bits specifying the original run and size numbers.

The problem with this circuit is that the first step takes two clock pulses to generate the address output to the multiplexer data lines, and as explained above, the performance of the entire system is impared unless each step can be accomplished in one clock pulse. More specifically, the adders 16 and 17 each take one clock pulse to produce an output. As explained above, if there is at least one leading zero, then at least two pixels will be output in two clock periods. The problem arises when there is no leading zero.

Figure 3:
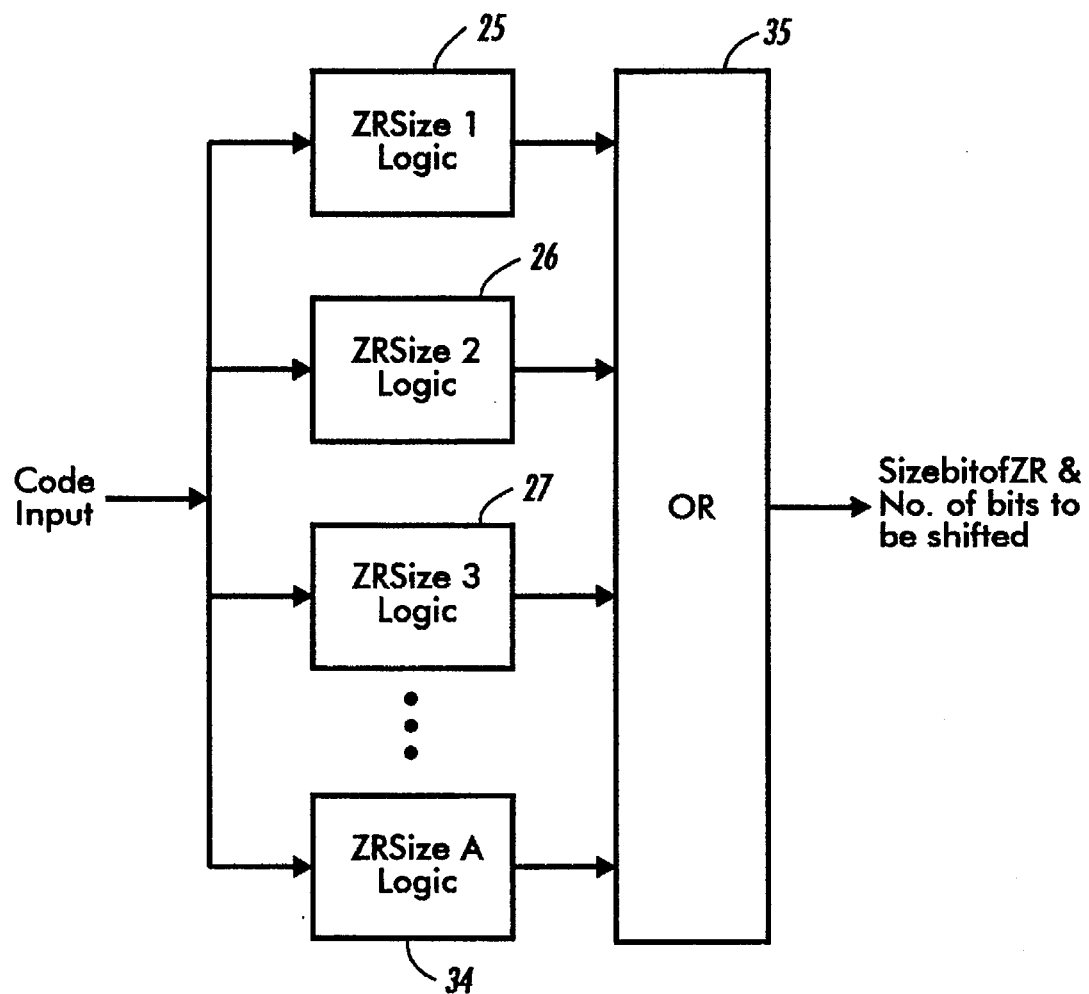
FIG. 3 is a block diagram of the additional gate array circuit for decoding coded words having no leading zero's.

To solve this problem, an additional circuit is provided. In fact, there are only 10 possible Huffman codes that can be used to describe a pixel with no leading zeros. Those are the ones corresponding to run and size combinations of 0,1 (no leading zeros and a 1 bit Huffman code), 0,2 (no leading zeros and a 2 bit Huffman code ), 0,3 (no leading zeros and a 3 bit Huffman code ), . . . , to 0,A (no leading zeros and a 10 bit Huffman code). This additional circuit is shown in FIG. 3. The first gate array 25 will output if the 8 bits of input data is exactly equal to the number used in the Huffman code to describe a run, size of 0,1; the second array 26 detects a run, size of 0,2, etc In order for this circuit to work in the system, as will be described below, the OR circuit of FIG. 3 and the look up table of FIG. 2 must output not only the decoded run and size, but also an indication of the total number of bits that the encoded word takes up in the encoded data stream, so that the correct number of new bits can be shifted into the register 33 at the end of the current decoding cycle, and so that the circuit can start porcessing the next code word. To use pixel #7 of FIG. 1 again, the entire coded word has an 8 bit Huffman code and a 9 bit data word for a total of 17 bits. Therefore, the OR circuit and look up table outputs must be 0000 (zero run length) 1001 ( pixel bit length of 9) and 10001 (the size of the entire code word, which is 17 bits in this case). Thus, the output of the OR circuits of Logic 35, the look up circuits of Logic 34 and the multiplexer 45 have to be 13 bits (4+4+5).

Figure 4:
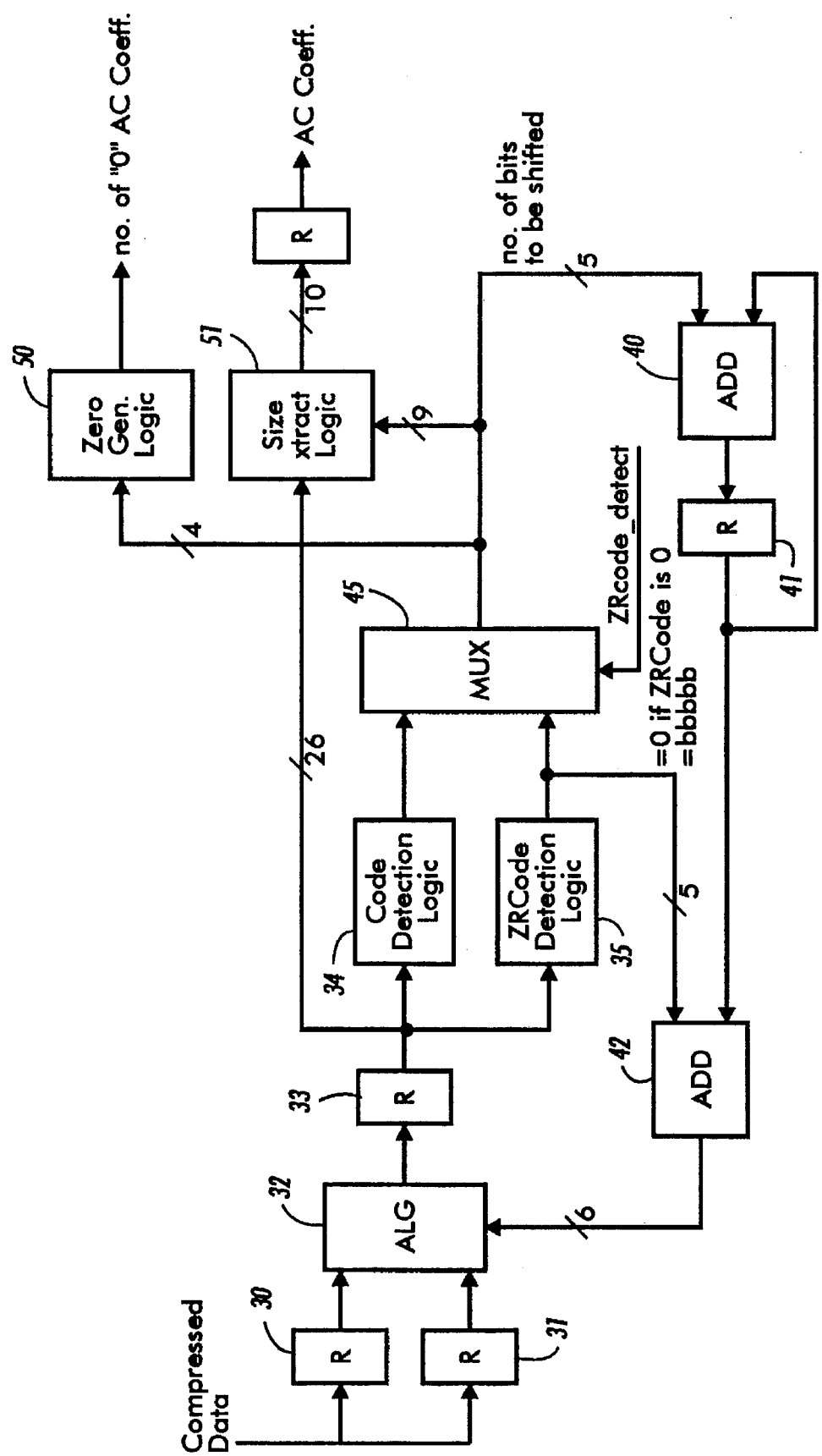
FIG. 4 is a block diagram of the circuit which receives the packed JPEG code words and outputs the run and size descriptors.

FIG. 4 is an overall diagram of that portion of the decoding circuit which generates the run and size numbers from the packed JPEG code words. Ping pong buffers 30, 31 supply 32 bit segments of JPEG coded data which are aligned in the alignment block 32 and then used to fill the buffer register 33 which supplies the Huffman codes to the following stages. Block 35 contains the 10 comparison circuits of FIG. 3, and block 34 contains the 16 address generator circuits which were discussed, along with Multiplexer 20 and look up table 21, in relation to FIG. 2, above. Multiplexer 45 selects the output of logic 35 described in FIG. 3 if there is an output from any one of the logic blocks 25–34 of FIG. 3. Otherwise, the output of logic block 34 is taken. In either case the output of any gate array 50 of FIG. 3 or the look up table 21 of FIG. 2, and therefore, the Multiplexer 45 output is the 4-bit run and 4-bit size which are decompressed from the Huffman code word, and an additional 5 bits which describe the total JPEG code word size. (The size of the JPEG word is automatically 8 bits larger (RRRR+SSSS) than the size of the data pixel, so it can be programmed into the look up table beforehand).

The 5 bits which describe the total JPEG size of the coded data just used in the last circuit process interation are applied from the multiplexer 45 through elements 40 and 41 to the alignment circuit 32 where they will be used to determine the starting point of the next Huffman code, and as a result, the next portion of the string of Huffman code data loaded into register 33. For a numerical example, let us assume that the first JPEG word was 16 bits in length. The number 16 is sent to the alignment circuit from register 41, and is also reapplied the the input of adder 40 for use in the next cycle. If the second JPEG word size is 10, then 10 and 16 will be added in adder 40 and the total 26 is applied to the alignment circuit 32. This shows that the next JPEG code word starts at bit position 26. Thus, it is seen, a running sum is kept to keep the alignment circuit informed on where each next code word starts. Finally, the adder 40 has a maximum output of 32 bits. In the event of an overflow, the overflow bit is used to switch from one ping pong buffer 30, 31 to the other in providing data to the alignment circuit 32.

A problem arises here since, in the processing of data with leading zeros, the alignment circuit 32 should be updated after every second clock, but if there are no leading zeros, the alignment circuit must be updated on the next clock. To provide an immediate update, additional adder 42 is provided. If any of the zero run length gate arrays detect a pixel with no leading zero's, a signal will be produced to select the size bits from the gate array 50 of logic block 35 and apply them directly to adder 42. On the other hand, if there are leading zero's, then the size bits are taken from the look up table in block 34 and applied through multiplexer 45 to adder 41. The result is that the correct sum is produced twice, with the first one from adder 42 controlling the alignment circuit 32 one clock cycle earlier if a pixel with no leading zero's is being processed.

The final steps are to generate the decoded data in the form of leading zeros and a non-zero pixel which, in this example, is an AC coefficient of a pixel in Lab color space. As shown in FIG. 4, the output of the multiplexer 45 is 13 bits. The first 4 RRRR bits are sent to logic block 50 which outputs leading zero's for the requested number of clock cycles. Next, the 26 bits of encoded data, starting from the beginning of the current code word, are sent to Logic block 51. The S bits are selected and used to determine the number of pixel data bits. Finally, the next number of data bits are output since they are the numerical portion of the code.

While the invention has been described with reference to a specific embodiment, it will be understood by those skilled in the art that various changes may be made and equivalents may be substituted for elements thereof without departing from the true spirit and scope of the invention. In addition, many modifications may be made without departing from the essential teachings of the invention.

What is claimed is:

1. In a system for decoding the Huffman portion of JPEG encoded data words at the rate of one encoded word per clock period, each JPEG encoded word comprising a Huffman code word representing data comprising a first 4 bits representing the number of leading zeros before a non-zero data word and the next 4 bits representing the number of binary bits in the non-zero data word, said system comprising means for determining the number of bits in said Huffman code, means for using said Huffman code word to generate an address, and means responsive to said address for outputting two numbers representing the number of leading zeros and the number of bits in the non-zero data word, the improvement comprising:

a circuit having 10 numbered elements, each responsive to the first 8 bits of said JPEG encoded data word, each gate array adapted to output in one clock cycle when a Huffman code word corresponding to zero leading zeros and a number of data word binary bits equal to the circuit element number is detected, said circuit element output being 4 zero bits representing that there are no leading zeros, and 4 bits representing the size of the data word, and means for selecting the output of said means for outputting if the non-zero word has leading zeros or of said circuit if the non-zero word has no leading zeros.

2. The system of claim 1 wherein only one element of said circuit can generate an output at a time, and wherein said circuit comprises an OR circuit for selecting the output of the one element that has generated an output.

3. The system of claim 1 wherein said elements are gate arrays.

4. The system of claim 1 wherein said means for selecting is a multiplexer.

\* \* \* \* \*